United States Patent [19]

Portmann

[11] 4,425,027

[45] Jan. 10, 1984

[54] LIQUID CRYSTAL DISPLAY CELL HAVING CAPACITANCE COMPENSATION

[75] Inventor: Hubert Portmann, Stationstrasse 16b, 6023 Rothenburg, Switzerland

[73] Assignee: Asulab, S.A., Switzerland

[21] Appl. No.: 330,187

[22] Filed: Dec. 14, 1981

[30] Foreign Application Priority Data

Dec. 19, 1980 [CH] Switzerland ............... 9387/80

[51] Int. Cl.³ .................................. G09G 3/36
[52] U.S. Cl. ....................... 350/331 T; 340/713; 340/784; 350/334
[58] Field of Search ................ 340/713, 784; 350/331 T, 334

[56] References Cited

U.S. PATENT DOCUMENTS

| | | | |
|---|---|---|---|
| 3,705,310 | 12/1972 | Wild | 350/331 T |
| 4,278,325 | 7/1981 | Kondo et al. | 350/331 T |
| 4,298,866 | 11/1981 | Hodemaekers | 340/713 |
| 4,390,874 | 6/1983 | Woodside et al. | 350/331 T |

Primary Examiner—Marshall M. Curtis
Attorney, Agent, or Firm—Allegretti, Newitt, Witcoff & McAndrews, Ltd.

[57] ABSTRACT

A liquid crystal display cell with thermal compensation of the degree of contrast comprises a measuring capacitor 12, 13 and a reference capacitor formed by two constituent reference capacitors 13, 15 and 14, 15 connected in series. The areas of the surfaces of the electrodes are so selected that the capacitances of the measuring and reference capacitors are approximately equal. The measuring and reference capacitors of the cell can be operated by excitation voltages of the same amplitude. The voltages which then appear at the terminals of the constituent reference capacitors are of lower amplitudes, corresponding to a region of the characteristics in which the capacitance is independent of temperature.

3 Claims, 8 Drawing Figures

LIQUID CRYSTAL DISPLAY CELL HAVING CAPACITANCE COMPENSATION

BACKGROUND OF THE INVENTION

The present invention concerns a liquid crystal display cell in which there are incorporated measuring and reference elements which, by means of an electronic circuit, make it possible to compensate for the variation in the contrast of the display in dependence on temperature. Such a cell can advantageously be used when use is made of a multiplexed addressing arrangement, as is the case for example in timepieces.

The low level of consumption of liquid crystal display cells and the fact that the operating voltages are low, of the order of three volts, means that such cells are being put to an increasing number of uses, in particular in portable devices.

However, as the number of items of information displayed increases, the number of connections for the cell also rises. This has unfavorable repercussions on the level of reliability, size and cost of the cell, making it more difficult for it to be used in watches. One way of reducing the number of connections on the cell, while retaining the same possible information modes an capacity, comprises using multiplexed addressing.

However, multiplexed addressing is less favorable from the point of view of distribution of the voltages among the various electrodes of a cell, than direct electrode-by-electrode addressing. This means that, in order to benefit from the reduced number of connections, the operating voltages of the cell must be suitably selected in dependence on the optical characteristics of the liquid crystal used in such a way that an item of information, for example a segment, can have only two states, visible and invisible. Now, the characteristics of the liquid crystals vary in dependence on temperature. This is the case in particular in regard to an important parameter, referred to as the optical threshold voltage, which is defined as being the value of the voltage applied to the electrodes of a segment, above which it begins to become visible. If the operating voltages of a cell are so selected that the display operates in the optimum manner at a certain temperature, at a different temperature the segments which should remain invisible may no longer be completely invisible, or segments which should remain visible may be visible but with an attenuated degree of contrast. In both cases, the result is a fall in the quality of the display with temperature, which can be to such an extent as to become unreadable.

One way of overcoming this difficulty would be to maintain the display at a constant temperature by a heating means but the consumption thereof would limit its uses and would exclude its being used in watches. Another way which is often used comprises employing a voltage divider formed by a resistor connected in series with semiconductor diodes. The voltage at the terminals of the diodes falls when the temperature rises, so it is possible to use it for supplying power to the cell. The level of compensation is not strict, but it is simple and its main disadvantage lies in the additional consumption of power due to the voltage divider.

Another way has been proposed in European patent application publication No. 0002920. This involves using an auxiliary capacitor which is incorporated in the cell, acting as a measuring element. The capacitor is formed by two electrodes which are disposed on the opposite main faces of the cell, having the liquid crystal as the dielectric. The value of the capacitance of the measuring capacitor depends inter alia on the temperature and the excitation voltage at which it is measured. Variation thereof in dependence on the above-mentioned voltage is highly non-linear, having a constant plateau for low voltages and a rising variation of parabolic type for higher voltages. The connection between the two curves precisely defines an electrical threshold voltage which depends on temperature. Now, at each temperature, the optical and electrical threshold voltages are practically equal as they correspond to the occurrence of the same phenomenon in the liquid crystal, namely the molecules turning from a direction perpendicular to the electrical field to a direction parallel thereto, in proportion to that field increasing. It should be noted however that the electrical phenomenon appears a little more quickly than the optical phenomenon, which causes a shift of about 0.1 volt between the electrical and optical threshold voltages. This is a small difference and it can be disregarded, although it is also possible to take account of it in a compensation circuit.

In accordance with the above-mentioned published application, thermal compensation for the display is achieved by controlling the operating voltages of the cell in dependence on the electrical threshold voltage, the latter varying with temperature in accordance with the same law as the optical threshold voltage. For that purpose, the impedance of the measuring capacitor of the cell is compared in a bridge to the impedance of a capacitor or another component serving as a reference, which is disposed outside the cell. If the two impedances are different, an error signal acts on an electronic circuit which alters the excitation voltage of the measuring capacitor so as to remove the unbalance. The resulting voltage corresponds to the electrical threshold voltage of the cell and the cell operating voltages can be directly derived therefrom. However, this form of compensation suffers from the disadvantage of requiring a reference element external to the cell, which is to be stable in respect of temperature. In addition, the capacitance of the measuring capacitor depends on the thickness of the display cell and the dielectric constant of the liquid crystal. As these two parameters may vary from one cell to another, the reference capacitor and the measuring capacitor of the cell must be individually paired, which is a major handicap in manufacture.

A cell which does not suffer from the above-indicated disadvantage is described in European patent application publication No. 0012479 and is shown in plan view in FIG. 1a and in section taken along line A—A in FIG. 1b of the accompanying drawings. It essentially comprises two glass plates 1 and 2, an insulating frame 3 for maintaining a constant spacing between the plates 1 and 2, and two polarisers 4 and 5, the polarization axes of which are parallel to the plates and perpendicular to each other in the described embodiment. Disposed on the inside faces of the plates 1 and 2 are transparent display electrodes, the combination of which reproduces the shape of the symbols to be displayed being in the present case four digits each formed by seven segments. The electrodes which are disposed on the rear plate 2 are often referred to as counter-electrodes. The output connections of the electrodes and their internal connections are not shown as they depend on the mode of controlling the cell. In addition, the inside faces of the plates 1 and 2 each carry an alignment layer intended to orient the molecules of the liquid crystal so as to be able to make use of the optical properties thereof. Finally, if reading and illumination of the display cell are from the same side, as is the case with a watch, a light reflector or diffuser 10 is placed behind the cell. Electrodes 6 and 8 forming a reference capacitor are arranged facing each other on the inside faces of the plates 1 and 2. A measuring capacitor is formed in a similar manner by means of electrodes 7 and 9. The areas of the electrodes 6 and 8 are equal to each other while being larger than the area common to the electrodes 7 and 9. The capacitance $C_R$ of the reference capacitor is therefore higher than the capacitance $C_M$ of the measuring capacitor. The variations in dependence on temperature of the voltage of the common point of the two capacitors are used to vary the operating voltages of the segments of the cell.

This cell suffers from the disadvantage that the excitation voltages of the measuring and reference capacitors must be different, the lower voltage being applied to the reference capacitor to cause it to operate in a region in which its characteristics are independent of temperature, which involves complication in the electronic circuit for supplying the voltages.

SUMMARY OF THE INVENTION

The present invention seeks to provide a temperature compensated liquid crystal display cell comprising measuring and reference capacitors having the liquid crystal as a dielectric, wherein the excitation voltages of the two capacitors are of equal amplitude.

To attain this aim, the present invention provides a liquid crystal display cell comprising a liquid crystal between a first plate and a second plate, at least one control electrode and counter-electrode which are each disposed on one of the plates, a temperature-dependent measuring capacitor comprising two electrodes which are each disposed on one of the plates, and a reference capacitor comprising electrodes disposed on the plates so as to form a plurality of constituent capacitors connected in series, the capacitance of each constituent capacitor being sufficiently larger than that of the measuring capacitor that, when the measuring and reference capacitors are each energized by a voltage in a range where the threshold of the measuring capacitor is temperature-dependent, each constituent capacitor, and hence the reference capacitor, have a substantially constant, non-temperature-dependent capacitance. The capacitances of the constituent capacitors may be equal to or different from each other, but they are preferably so selected that the capacitance of the assembly, which corresponds to the capacitance of the reference capacitor, is substantially equal to the capacitance of the measuring capacitor.

When the excitation voltages of equal amplitude are applied to the measuring and reference capacitors, the voltage which appears at the terminals of each of the constituent capacitors forming the reference capacitor is a fraction of the excitation voltage. For example, in the case of two equal constituent capacitors, the voltage at the terminals of each capacitor is half the excitation voltage. If, in addition, the excitation voltage is substantially equal to the electrical threshold voltage, each of the constituent capacitors is therefore subjected to a voltage such that its capacitance is of a value which is certainly independent of temperature. The capacitance of the reference capacitor resulting from the series connection of the constituent capacitors is therefore also independent of temperature although it is subjected to the same voltage as the measuring capacitor.

BRIEF DESCRIPTION OF THE DRAWINGS

An illustrative embodiment of the invention will now be described with reference to the drawings in which:

FIG. 3b shows the variation in the capacitance of a capacitor of the cell in dependence on the same parameters as in FIG. 3a.

DETAILED DESCRIPTION OF THE PREFERRED EMBODIMENT

Figures 1A, 1B:
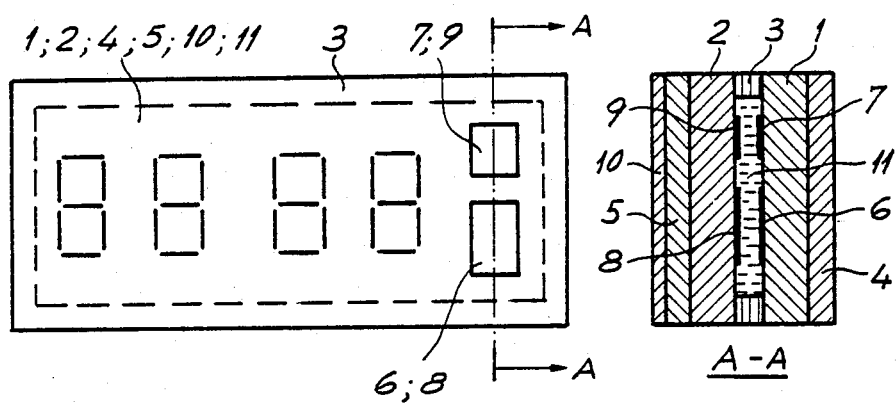
FIG. 1a, to which reference has already been made above, is a plan view of a display cell comprising four seven-segment digits and two capacitors, corresponding to a known construction.
FIG. 1b, to which reference has already been made above, is a view of the cell shown in FIG. 1a, in section taken along line A—A passing through the two capacitors.
Figures 2A, 2B, 2C:
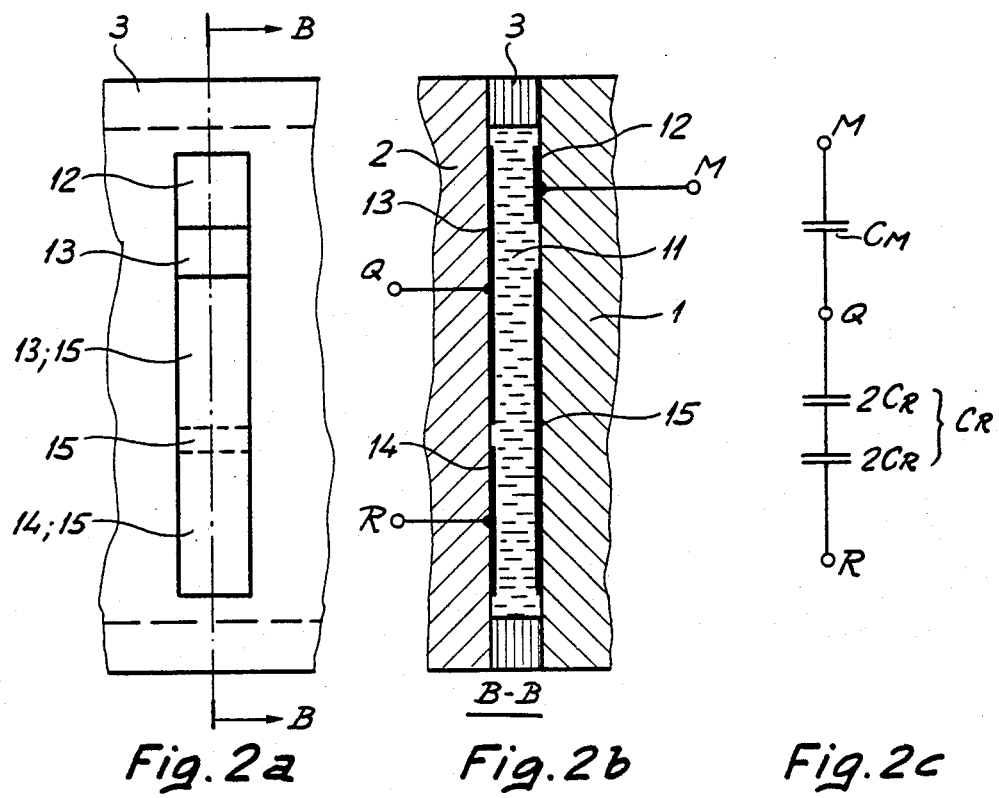
FIGS. 2a and 2b are a plan view and a view in section taken along line B—B of the capacitors incorporated in a cell according to the invention.
FIG. 2c is a circuit of the capacitors and their connections.

The cell according to the invention, part of which is shown in FIGS. 2a and 2b, conventionally comprises electrodes and counter-electrodes for controlling the various display elements (not shown). A measuring capacitor is formed by an electrode 12 disposed on the plate 1 and by an electrode 13 which is larger than the electrode 12 and which is disposed on the plate 2 facing the latter. The capacitance $C_M$ of the measuring capacitor is proportional to the area of the electrode 12. A reference capacitor is formed by an electrode 14 disposed on the plate 12 besides the electrode 13 and an electrode 15 which is larger than the electrode 13 and which is disposed on the plate 1 facing the electrode 14 and a part of the electrode 13. The electrode 15 is common to two constituent capacitors and thus provides for the series connection of two constituent capacitors. The first and these capacitors is formed by the parts of the electrodes 13 and 15 which are disposed facing each other. Its capacitance is proportional to the area defined in FIG. 2a by the overlapping parts of the electrodes 13 and 15. The second of the capacitors the electrode 14 and the part of the electrode 15 facing it. Its capacitance is determined by the area of the surface defined by the overlapping parts of the electrodes 14 and 15. The electrodes 12, 13, 14 and 15 can easily be so dimensioned that the capacitance $C_M$ and the capacitance $C_R$ of the reference capacitor formed by the series connection of the above-mentioned two constituent capacitor are equal, or in any relationship. It will be apparaent that the reference capacitor having also a capacitance $C_R$, could be formed by any number of constituent capacitors connected in series and having capacitances which are equal to or different from each other.

In another embodiment, the measuring capacitor and each constituent reference capacitor may each be formed by a pair of electrodes of the same form, which are arranged facing each other on the plates 1 and 2. All the constituent capacitors are then connected in series by external connections.

FIG. 2c shows the equivalent circuit diagram corresponding to the preferred form of the electrodes in which points M, Q and R respectively correspond to the connections of the electrodes 12, 13 and 14.

Figure 3A:
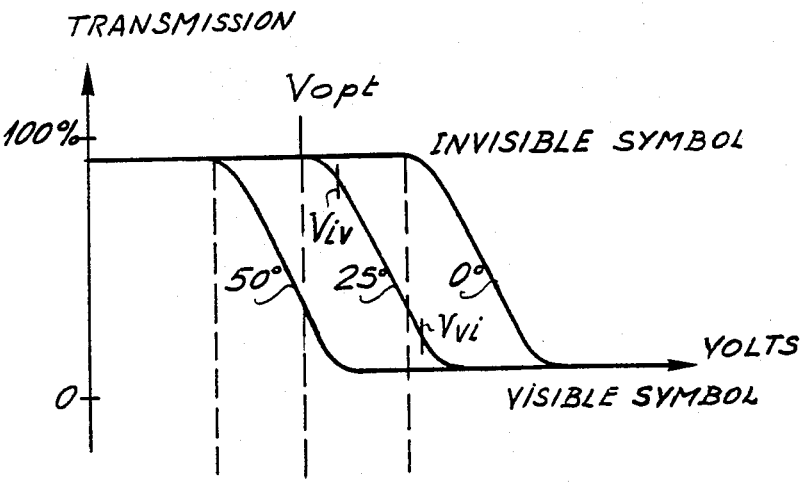
FIG. 3a shows the variation in the optical transmission factor of a liquid crystal cell in dependence on the operating voltage of the cell and temperature.

For making use of the optical and electrical properties of a liquid crystal of the helicoidal nematic type, a prior orientation of the major axis of its molecules in a direction parallel to the plates is required. This orientation effect is produced by means of alignment layers deposited on the inside faces of the plates 1 and 2 (they are not shown in the drawings). If a continuous voltage $V=$ of either polarity is then applied between the electrode and the counter-electrode of a symbol, for example, a segment, an electric field is produced, in a direction perpendicular to the plates 1 and 2 and to the large axis of the molecules of the liquid crystal. The optical effect of that field is imperceptible as long as the applied voltage remains below an optical threshold voltage $V_{opt}$. Once that value is exceeded, the transmission of light is progressively reduced until reaching a saturation level, corresponding to a level of transmission close to zero. FIG. 3a shows the above-indicated variation, and also the strong dependency of the characteristics on temperature.

Another important characteristic of a liquid crystal is its dielectric constant. It is measured by the incremental or small signals value of the capacitance $C_M$ of the measuring capacitor, formed by the electrodes 12 and 13 of FIG. 2b. This measurement is taken in dependence on the continuous voltage $V=$, of either polarity, which is applied to the electrodes, between which appears an electric field perpendicular to the plates 1 and 2. The measuring capacitance $C_M$ remains of a virtually constant value $C_{MO}$ as long as the voltage $V=$ is lower than an electrical threshold voltage $V_{el}$. When that voltage exceeds the threshold $V_{el}$, the capacitance increases and becomes highly dependent on temperature, as shown in FIG. 3b.

Figure 3B:
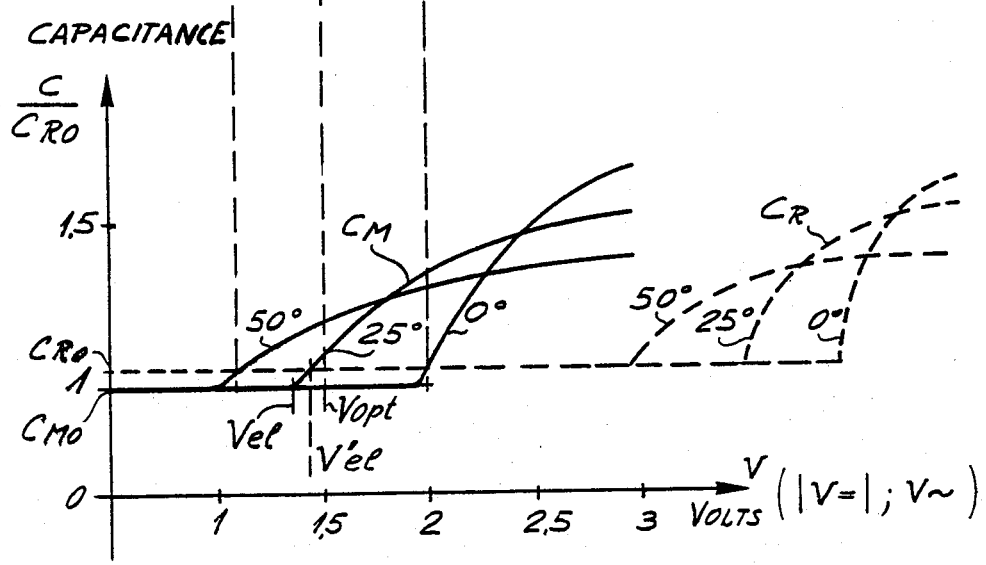

FIG. 3b also shows the variations in the capacitance $C_R$ of the reference capacitor. As in the present example it is formed by two constituent capacitors having the same capacitance $2C_R$ which are connected in series, each of the constituent capacitors is subjected only to half the voltage applied to the cell. The result of this is that the electrical threshold voltage of the capacitance $C_R$ of the resulting reference capacitor is twice that of the capacitance $C_M$ of the measuring capacitor. Thus, on one hand, in the voltage range in which the display cell operates, the reference capacitor retains a constant capacitance $C_{RO}$. On the other hand, an important parameter in the device for compensation of the cell in dependence on temperature is the ratio $C_{MO}/C_{RO}$ of the capacitances of the measuring and reference capacitors. As those capacitors are disposed on the cell, their ratio is independent of the variation in the spacing between the plates 1 and 2 and the variation in the dielectric constant of the liquid crystal 11. This is an important advantage in regard to manufacture, with respect to the construction described in above-mentioned European patent application publication No. 0002920 in which the reference capacitor is a discrete component which has to be paired to each display cell.

It should be noted that, as the continuous voltage $V=$ applied to the electrodes of a segment or a capacitor is of any polarity, the liquid crystal therefore reacts only to the absolute value $|V=|$ of that voltage. The voltage may also be an AC voltage of zero mean value, but in that case it is its RMS value $V\sim$ which must be considered. These voltages will thus always be denoted by V, it being appreciated that $|V=|$ will be understood in the continuous voltage case and $V\sim$ in the AC case.

The system of characteristics in FIG. 3a show that, for a segment of a display to remain invisible, an operating voltage $V'_{att}$ at the terminals of its electrodes must be at most equal to a voltage $V_{iv}$ at which it just begins to become apparent. In order for the same segment to become fully visible, it must be operated by a voltage $V''_{att}$ which is at least equal to a voltage $V_{vi}$, being the voltage as from which the degree of contrast becomes acceptable. In direct addressing of the cell, that is to say, electrode by electrode, that condition can be easily achieved by taking a zero voltage for $V'_{att}$ and a voltage higher than $V_{vi}$ for $V''_{att}$. As the optical threshold voltage $V_{opt}$ decreases when the temperature rises, the display will operate correctly at all temperatures higher than that which made it possible to define $V_{vi}$.

When the cell is actuated with multiplexed voltages, the degree of multiplexing defines the ratio of the voltages which will be applied to the electrodes. Therefore, those voltages can no longer be selected on an arbitrary basis, in dependence for example on the temperature range in which the display is to operate. In the case of a cell for a watch, the ratio $V''_{att}/V'_{att}$ is about two and is not much higher than the ratio $V_{vi}/V_{iv}$. This means that, at a given temperature, the selection in respect of the operating voltages is already critical. A rapid deterioration in the degree of contrast of the display will thus result from any temperature change, making it essential to have recourse to thermal compensation.

Study of FIG. 3a shows that, in dependence on temperature, the optical characteristics of a liquid crystal undergo a translation effect without substantial modification in their form. Good thermal compensation can thus be achieved by making the operating voltages $V'_{att}$, $V''_{att}$ at dependent on the optical threshold voltage $V_{opt}$. However, $V_{opt}$ cannot be easily determined. Instead, it is preferable to use the electrical threshold $V_{el}$ which is very close to the optical threshold voltage and which can be measured by means of the circuit shown in FIG. 4.

Figure 4:
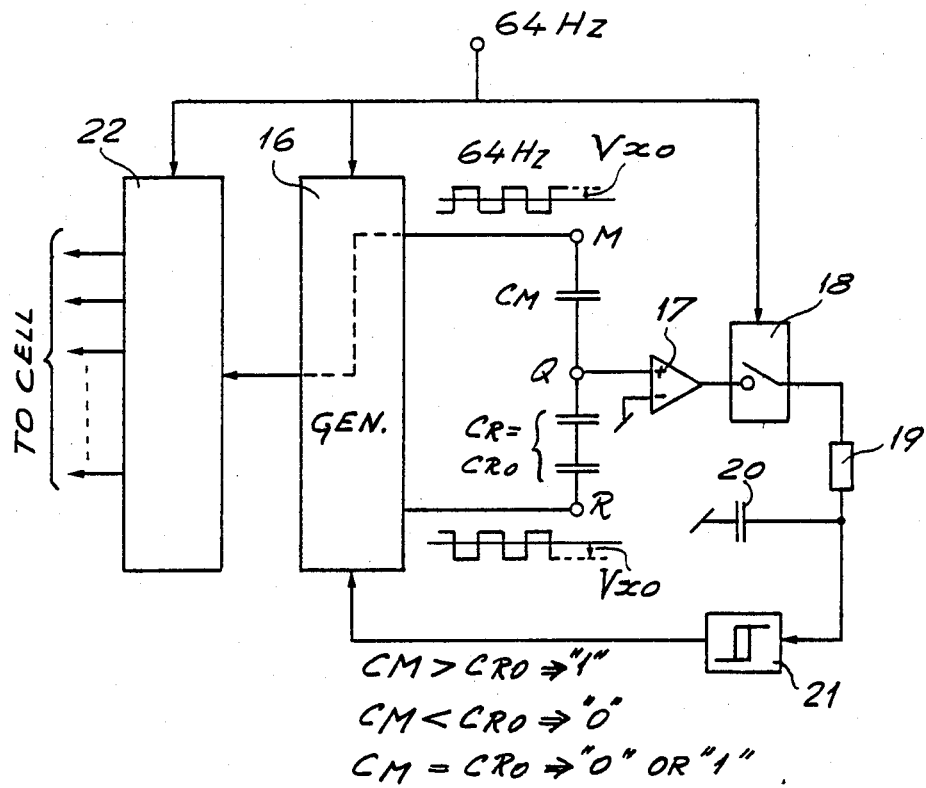
FIG. 4 shows the basic circuit diagram of the electronic circuit for measuring the electrical threshold voltage and controlling the operating voltages of a cell according to the invention.

The circuit of FIG. 4 comprises a generator 16 producing two alternating square-wave voltages $V_x$ and $-V_x$ in phase opposition, of amplitude $V_{xo}$, at a frequency of 64 Hz for example. Those voltages are applied to the terminals of the assembly formed by the series connection of the measuring capacitor having a capacitance $C_M$ and a reference capacitor having a constant capacitance $C_R$ equal to $C_{RO}$. The voltage at the point Q which is common to the two capacitors is of a value $U_Q=2V_x(C_M-C_{RO})/(C_M+C_{RO})$; the amplitude thereof essentially depends on $C_M-C_{RO}$ and its phase with respect to $V_x$ on the sign of $C_M-C_{RO}$. That signal which is amplified by an amplifier 17 is then rectified by a synchronous detector 18 which is controlled by the same frequency of 64 Hz, and filtered by means of a circuit formed by a resistor 19 and a capacitor 20. The continuous voltage at the terminals of the capacitor 20 is therefore positive if $C_M$ is greater than $C_{RO}$, negative if $C_M$ is smaller than $C_{RO}$ and zero if $C_M=C_{RO}$. That voltage is applied to a Schmitt trigger circuit 21 which produces a logic state 1 for example at its output when $C_M$ is greater than $C_{RO}$, a logic state 0 when $C_M$ is smaller than $C_{RO}$. The logic output signal is applied to a control input of the generator 16 which is so arranged (in a manner not described herein) that a progressive reduction in $V_{xo}$ corresponds to logic state 1 and a progressive increase in $V_{xo}$ corresponds to logic state 0. It should be noted that, the voltage $V_x$ being alternating and of square form, it is its RMS value which must be considered. In this case, the RMS value is equal to $V_{xo}$.

The principle of the control action is then as follows: let us assume that there is equality between the two capacitances $C_M$ and $C_{RO}$ at a given temperature and that $C_{MO}$ is smaller than $C_{RO}$. If the temperature rises, $C_M$ increases, as can be seen from FIG. 3b, logic state 1 appears at the output of the trigger circuit 21. The logic state 1 causes, in the circuit 16, a progressive reduction in the amplitude $V_{xo}$ of the applied voltage, and this continues until $C_M$ becomes slightly less than $C_{RO}$. The logic signal at the output of the trigger circuit 21 then goes from state 1 to state 0, that change reversing the direction of the change in $V_{xo}$ which begins to increase until $C_M$ slightly exceed $C_{RO}$. The logic state will then reverse again, causing a slight oscillation of $V_{xo}$ about the value $V'_{el}$ in respect of which $C_M = C_{RO}$, being very close to the electrical threshold voltage $V_{el}$ corresponding to the new temperature. The voltage $V'_{el}$ which is measured in this way will, finally, make it possible to produce, by means of the circuit 22, the voltages $V'_{att}$, $V''_{att}$, which are also square waves and at a frequency of 64 Hz, which are necessary for the cell, and the amplitudes of which are directly linked to $V'_{el}$.

The circuit shown in FIG. 4a may be modified in various ways. For example, sequential operation would make it possible to eliminate the oscillation of $V_{xo}$, by storing the value thereof between two measurement operations. It is also possible, instead of the square-wave voltages, to use alternating voltages of zero means value formed by pulses of a duration $\tau$, the RMS value of such a voltage then depends on $\tau$ and the control action can be produced by no longer varying an amplitude but by varying a duration i.e., by varying the mark-square ratio, which is easier to achieve with logic circuits.

Various other modifications may be made in the form of the invention without departing from the principles disclosed in the foregoing illustrative embodiments. It is intended therefore that the accompanying claims be construed as broadly as possible consistent with the prior art.

What is claimed is:

1. A liquid crystal display cell comprising a liquid crystal between a first and a second plate, at least one control electrode and counter-electrode disposed each on one of the plates, a measuring capacitor comprised of two electrodes disposed each on one of the plates, the capacitance of the measuring capacitor being temperature dependent when said measuring capacitor is submitted to a voltage in the range of the threshold voltage of the liquid crystal, and a reference capacitor formed by a plurality of series connected constituent capacitors comprised each of two electrodes disposed each on one of the plates, the capacitance of the reference capacitor being substantially temperature-dependent when submitted to said voltage.

2. A display cell according to claim 1, wherein the capacitance of the reference capacitor is substantially equal to the capacitance of the measuring capacitor.

3. A display cell according to claim 2, wherein there are two constituent capacitors.

* * * * *

UNITED STATES PATENT AND TRADEMARK OFFICE
CERTIFICATE OF CORRECTION

PATENT NO. : 4,425,027
DATED : January 10, 1984
INVENTOR(S) : Hubert F. Portmann It is certified that error appears in the above—identified patent and that said Letters Patent is hereby corrected as shown below:

Column 8, line 27, delete "temperature-dependent" and substitute —temperature-independent—.

Signed and Sealed this

Fifth Day of March 1985

[SEAL]

Attest:

DONALD J. QUIGG

Attesting Officer

Acting Commissioner of Patents and Trademarks